United States Patent [19]

Cabib et al.

[11] Patent Number: 5,823,681
[45] Date of Patent: Oct. 20, 1998

[54] MULTIPOINT TEMPERATURE MONITORING APPARATUS FOR SEMICONDUCTOR WAFERS DURING PROCESSING

[75] Inventors: Dario Cabib, Timrat; Robert A. Buckwald, Ramat Ishay; Michael E. Adel, Zichron Yakov, all of Israel

[73] Assignee: C.I. Systems (Israel) Ltd., Migdal Haemek, Israel

[21] Appl. No.: 604,997

[22] PCT Filed: Jul. 12, 1995

[86] PCT No.: PCT/US95/08521

§ 371 Date: Feb. 29, 1996

§ 102(e) Date: Feb. 29, 1996

[87] PCT Pub. No.: WO96/04534

PCT Pub. Date: Feb. 15, 1996

[30] Foreign Application Priority Data

Aug. 2, 1994 [IL] Israel ........................................ 110549

[51] Int. Cl.⁶ .................. G01J 5/08; G01J 5/02; G01J 5/28; G01J 5/62; G01J 5/06
[52] U.S. Cl. .................. 374/126; 374/130; 374/128; 374/133; 374/131; 374/1; 392/416; 118/724
[58] Field of Search ................... 374/1, 9, 126, 374/131, 133, 128, 130; 356/44; 250/338.1; 392/416; 219/390, 405, 411; 118/50.1, 724

[56] References Cited

U.S. PATENT DOCUMENTS

| | | |
|---|---|---|
| 3,537,314 | 11/1970 | Svet ........................................ 374/127 |
| 3,796,099 | 3/1974 | Shimotsuma ............................ 374/126 |
| 4,037,470 | 7/1977 | Mock et al. ............................... 374/32 |
| 4,120,582 | 10/1978 | De Vries et al. ......................... 356/73 |
| 4,156,461 | 5/1979 | Cha . |
| 4,470,710 | 9/1984 | Crane et al. ............................. 374/127 |
| 4,561,786 | 12/1985 | Anderson ................................ 374/127 |
| 4,647,774 | 3/1987 | Brisk et al. .............................. 374/128 |
| 4,890,245 | 12/1989 | Yomoto et al. ......................... 374/121 |
| 4,919,542 | 4/1990 | Nulman et al. ......................... 374/126 |
| 4,956,538 | 9/1990 | Moslehi .................................. 219/405 |
| 4,969,748 | 11/1990 | Crowley et al. ........................ 374/126 |
| 4,979,133 | 12/1990 | Arima et al. ......................... 250/338.1 |
| 4,979,134 | 12/1990 | Arima et al. ............................ 374/126 |
| 5,029,117 | 7/1991 | Patton .................................... 374/126 |
| 5,156,461 | 10/1992 | Moslehi et al. ........................ 374/126 |
| 5,305,416 | 4/1994 | Flory ...................................... 392/416 |
| 5,326,173 | 7/1994 | Evans et al. ............................... 374/9 |
| 5,347,128 | 9/1994 | Puram et al. .............................. 374/9 |
| 5,460,451 | 10/1995 | Wadman ................................ 374/130 |

Primary Examiner—Diego F. F. Gutierrez
Attorney, Agent, or Firm—Mark M. Friedman

[57] ABSTRACT

An emissivity compensating non-contact system for measuring the temperature of a semiconductor wafer. The system includes a semiconductor wafer emissivity compensation station for measuring the reflectivity of the wafer at discrete wavelengths to yield wafer emissivity in specific wavelength bands. The system further includes a measurement probe which is optically coupled to a semiconductor process chamber. The probe senses wafer self emission using one or more optical detectors and a light modulator. A background temperature determining mechanism independently senses the temperature of a source of background radiation. Finally, a mechanism calculates the temperature of the semiconductor wafer based on the reflectivity, self-emission and background temperature.

21 Claims, 7 Drawing Sheets

MULTIPOINT TEMPERATURE MONITORING APPARATUS FOR SEMICONDUCTOR WAFERS DURING PROCESSING

FIELD AND BACKGROUND OF THE INVENTION

The present invention relates to methods and systems for monitoring the temperature of semiconductor wafers during processing.

The measurement of the temperature of a semiconductor wafer using remote, or non-contact, means during processing is technologically important. Conventional pyrometry, which is the mainstay temperature measurement technique for such applications suffers from significant limitations which have been overcome with varying degrees of success by a number of innovations in recent years. These limitations include the following.

First, the emissivity of the semiconductor wafer, i.e., the wafer emission relative to the emission of a perfect blackbody at the same temperature, is generally not known and is dependent on wavelength, temperature and surface conditions, such as morphology and the presence of layers & other structure.

Second, the semiconductor wafer is often transparent to radiation in the wavelength band in which the pyrometer operates, which precludes the use of conventional pyrometry. In some cases the wafer goes from transparent to opaque during the process as a result of the deposition of metallic or other materials.

Third, in typical processing environments various hot objects act as sources of background radiation and contribute to the signal detected by the pyrometer, thereby introducing errors in the temperature measurement.

Finally, semiconductor wafer processing is frequently carried out simultaneously in a number of different process chambers within a single cluster tool. It would therefore be advantageous to be able to simultaneously measure temperatures in different locations using a single cost effective system.

Considerable prior art is available describing different techniques and apparatus designed to overcome some of the above limitations.

Many techniques have been proposed in which the emissivity of a remote body is determined by measurement of reflectivity and by use of Kirchoff's law. For example, Brisk et al. (U.S. Pat. No. 4,647,774, incorporated by reference), uses a collimated laser beam which is bounced off a remote target. Yomoto et al. (U.S. Pat. No. 4,890,245, incorporated by reference), Nulnan et al. (U.S. Pat. No. 4,919,542, incorporated by reference) and Moslehi et al. (U.S. Pat. No. 5,156,461, incorporated by reference), all suggest similar concepts specifically for the measurement of semiconductor wafer temperatures.

However, in all cases it is implicit that collimated, rather than convergent, radiation is used to perform the reflection measurements from the wafer surface. While the use of collimated radiation has the advantage of allowing remote optical access it may result in erroneous reflectivity measurements and hence inaccurate emissivity estimates from surfaces which are not optically smooth in the wavelength band of interest.

Moslehi et al. have proposed a technique to overcome this shortcoming which entails the use of laser scatterometry to measure the wafer "scattering parameter" at one wavelength. Laser scatterometry is utilized to extract the scattering parameter at a different wavelength from that of the optical pyrometer. The emissivity may then be computed by combining this scattering parameter with the specular reflectivity measured in the pyrometer wavelength band. However, this technique requires considerable hardware and various empirically derived relations. Furthermore, Moslehi et al. have proposed a technique with a view toward application in rapid thermal processing and have therefore chosen in their detailed description a pyrometer wavelength band in the mid infrared (5.4 microns).

Yomoto and Moslehi et al. also suggest measurement of transmissivity T in conjunction with reflectivity R for the case of transparent wafers, and suggest the use of the more general form of Kirchoff's Law, $\epsilon=1-R-T$, where T is transmission, R is reflectivity and $\epsilon$ is emissivity. However, even this procedure will yield erroneous values of T and possibly of R, and consequently erroneous emissivity, $\epsilon$, where collimated radiation is used and at least one of the wafer surfaces is not optically smooth.

Crowley et al. (U.S. Pat. No. 4,969,748, which is incorporated by reference), have also suggested the measurement of wafer reflectivity in an independent chamber prior to processing. However, no details are given as to optics used, and it is apparent from the drawings that collimated radiation is used, allowing only the specular component of the reflectivity to be measured. Furthermore, exact spectral throughput of the "reflectivity chamber" optics is not described and would appear to be broad band.

Crowley et. al also suggest the use of a two stage calibration technique in which a general pyrometer calibration table is determined with a thermocouple instrumented wafer. The second stage involves utilizing an arbitrary wafer selected from a batch of a particular lot to obtain a specific correction factor to the pyrometer reading for the batch of wafers to be processed. This is an inherent disadvantage in that a specific calibration must be carried out for every different kind of batch wafer, a procedure which is unacceptable in a true production environment.

Various techniques have been suggested to compensate for the background radiation resulting from other hot bodies in the vicinity of the semiconductor wafer. Nulman et. al (U.S. Pat. No. 4,919,542, incorporated by reference) allude to a method for measuring radiation which emanates from the walls of the chamber. However, no details are made available.

There is thus a widely recognized need for, and it would be highly advantageous to have, a multipoint temperature monitoring apparatus for semiconductor wafers during processing which would overcome the disadvantages of presently known systems as described above.

SUMMARY OF THE INVENTION

According to the present invention there is provided an emissivity compensating non-contact system for measuring the temperature of a semiconductor wafer, comprising: (a) a semiconductor wafer emissivity compensation station for measuring the reflectivity of said wafer at discrete wavelengths to yield wafer emissivity in specific wavelength bands; (b) a measurement probe which is optically coupled to a semiconductor process chamber, said probe sensing wafer self emission by means of at least one optical detector and a light modulator; (c) background temperature determining means for independently sensing the temperature of a source of background radiation; and (d) means for calculating the temperature of said semiconductor wafer based on said reflectivity, self-emission and background temperature.

BRIEF DESCRIPTION OF THE DRAWINGS

The invention is herein described, by way of example only, with reference to the accompanying drawings, wherein:

FIG. 7(A,B) flow diagram of a calibration procedure;

DESCRIPTION OF THE PREFERRED EMBODIMENTS

The present invention is of a non-contact semiconductor wafer temperature monitoring system and method which can be used to monitor the temperature of wafers during processing.

The current invention has at least two significant advantages over previously known configurations such as that disclosed by Crowley et al. First, the optics used herein are convergent which allows both the specular and diffuse components of the reflected radiation to be collected and utilized. Second, the reflectivity measurement is carried out over a plurality of discrete wavelengths, which enhances the accuracy and precision of the measurements.

Furthermore, while Moslehi et al. have proposed a technique with a view toward application for rapid thermal processing and have therefore chosen in their detailed description a pyrometer wavelength band in the mid infrared region (5.4 $\mu$m), in the present invention, the use of innovative optics has made it possible to carry out pyrometry in the near infra-red (0.7 to 2.2 $\mu$m) which gives the additional advantage of high radiance contrast and lower sensitivity to accuracy of emissivity calibration.

The principles and operation of a system and method according to the present invention may be better understood with reference to the drawings and the accompanying description.

Figure 1:
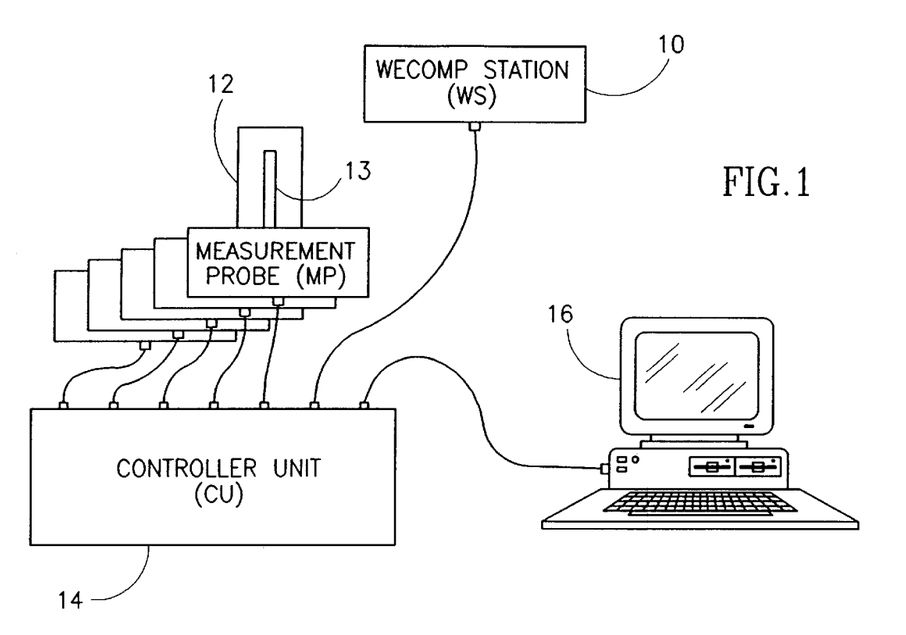
FIG. 1 illustrates the major components of a system according to the present invention and the interconnections between them.
Figure 2:
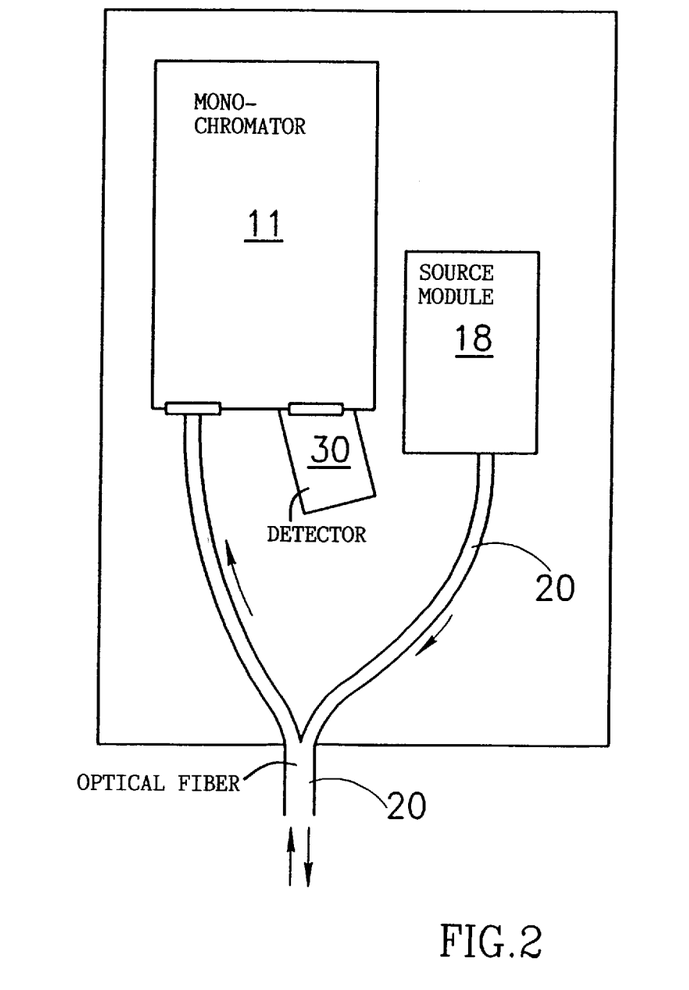
FIG. 2 illustrates a monochromator subassembly of the wafer emissivity compensation station (WECOMP) station of the system of FIG. 1.
Figure 3:
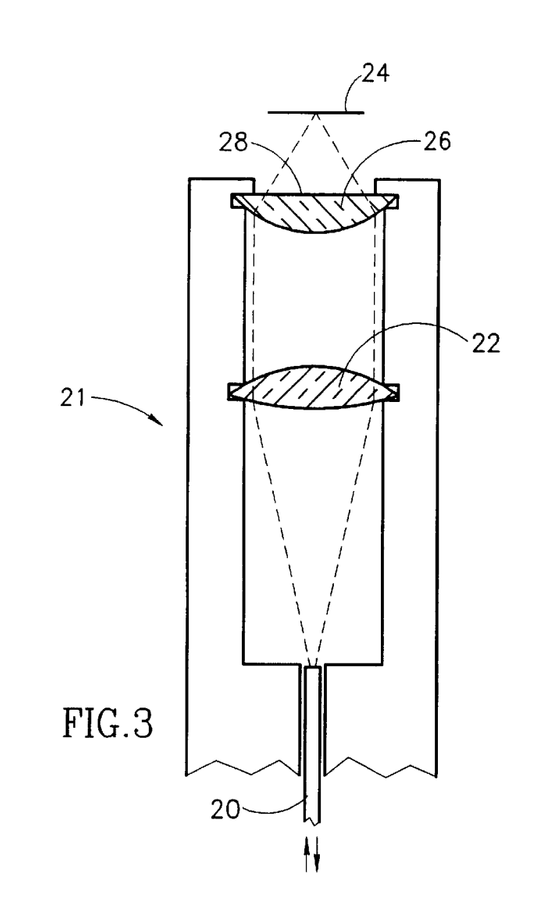
FIG. 3 illustrates the coupling optics subassembly of the wecomp station of FIG. 1.

Referring now to the drawings, FIG. 1–3 illustrates the main components of a system according to the present invention. A wafer emissivity compensation (hereinafter "WECOMP") station 10 is used to carry out reflectivity and transmission measurements on every wafer prior to its entering any one of several, for example, five, processing chambers 12 to which are coupled measurement probes 13. Probe 13 preferably operates in a specific optical band pass determined, on the long wavelength side, by the "cut-off" behavior of the photoconductive or photovoltaic detector, i.e., the semiconductor optical absorption edge, and, on the short wavelength side, by the very sharp spectral drop off of the Planck function.

WECOMP station 10 and all probes 13 are electronically coupled to a controller unit 14 which controls acquisition and preliminary signal processing before downloading digital data from WECOMP station 10 and all probes 13 to a personal computer 16, or other microprocessor-based digital instrument. Personal computer 16 calculates wafer temperature in each of process chambers 12 and relays these data via other digital information channels or to a visual display unit.

WECOMP station 10 preferably includes a monochromator 11 which is shown in FIG. 2. WECOMP station 10 further includes a source module 18 which generates polychromatic radiation over a continuous range of wavelengths.

The radiation is transmitted via an optical fiber 20 to the coupling optics 21 shown in FIG. 3. It is to be noted that optical fiber 20 at the bottom of FIG. 2 is the same optical fiber 20 as at the bottom of FIG. 3. The coupling optics collimates the radiation emanating from optical fiber 20 using collimating lens 22 and refocuses the radiation on the wafer 24 using focusing lens 26. The convergent beam of large angular acceptance coming out of focusing lens 26 leaves coupling optics 21 and optical window 28 and impinges on semiconductor wafer 24. The large angular acceptance (low F number) of coupling optics 21 allows for the simultaneous measurement of both specular and diffuse reflectance, thereby improving emissivity estimation.

The reflected beam is then collected by the same optics and focussed back on the same optical fiber 20, through which it is conducted to monochromator 11 which accepts radiation only within a narrow acceptance angle. Preferably, monochromator 11 measures wafer emissivity in specific wavelength bands of from about 0.7 to about 2.4 microns. The signal is detected by detector 30 and is then spectrally analyzed at consecutive discrete narrow wavelength bands within the spectral range of the measurement probe detectors.

Any suitable detector 30 may be used, such as detectors which include one or more of Si, Ge or InAs. Preferably, monochromator 11 measure wafer emissivity in specific bands between about 0.7 and about 2.3 $\mu$m.

The signal from detector 30 is then processed and digitally transmitted to personal computer 16 as input to the calibration and measurement algorithms, which are described in more detail below.

Figure 4:
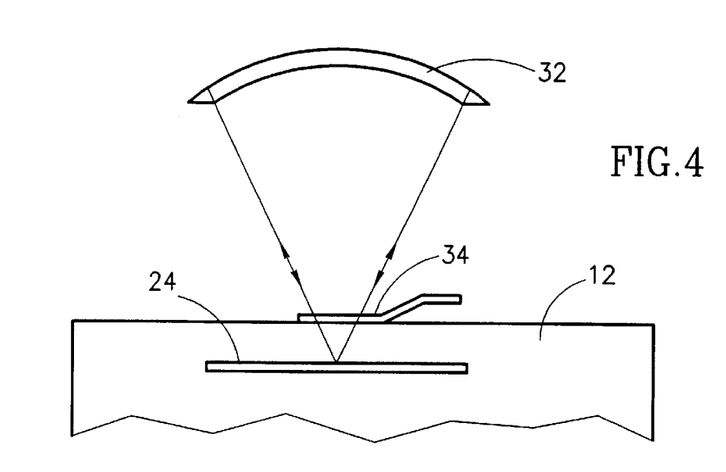
FIG. 4 illustrates a spherical mirror assembly which is preferably mounted above the coupling optics on the wecomp station to facilitate improved emissivity compensation.

The versatility and performance of WECOMP station 10 is preferably augmented by the inclusion of a spherical mirror 32, shown in FIG. 4 which may be intermittently positioned, as by use of a suitable shutter 34, above the wafer at a distance equal to the radius of curvature of spherical mirror 32 in order to improve the emissivity compensation, especially when transparent wafers are measured. Spherical mirror 32 performs two important functions. First, spherical mirror 32 simulates the reflectivity of semiconductor wafer 23 after a highly reflective layer has been deposited on the top surface of the wafer. Second, spherical mirror 32 allows measurement of the transmission of wafer 24 in order to facilitate estimation of the wafer emissivity in cases where the wafer is transparent in the spectral band of the detector in use. Thus, the use of spherical mirror 32 makes it possible to utilize the more general form of Kirchoff's Law, i.e., $\epsilon = 1 - R - T$.

Spherical mirror 32 may be positioned remotely from the wafer itself, that is, outside process chamber (as shown in FIG. 4), beyond a window even in the case of convergent optics in the reflectivity measurement station.

Figure 5A:
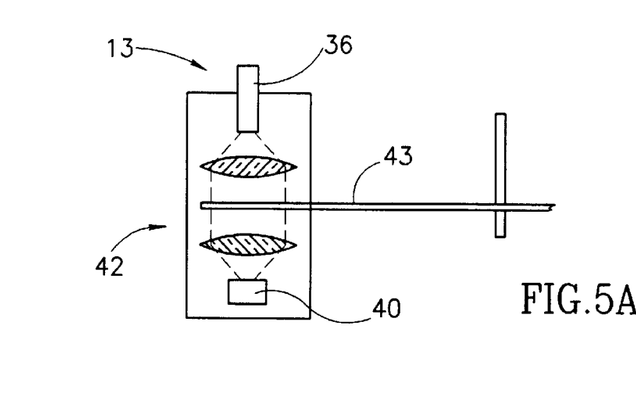
FIGS. 5A and 5B illustrate, in side view and top view, respectively, a measurement probe assembly according to one embodiment of the present invention.
Figure 5B:
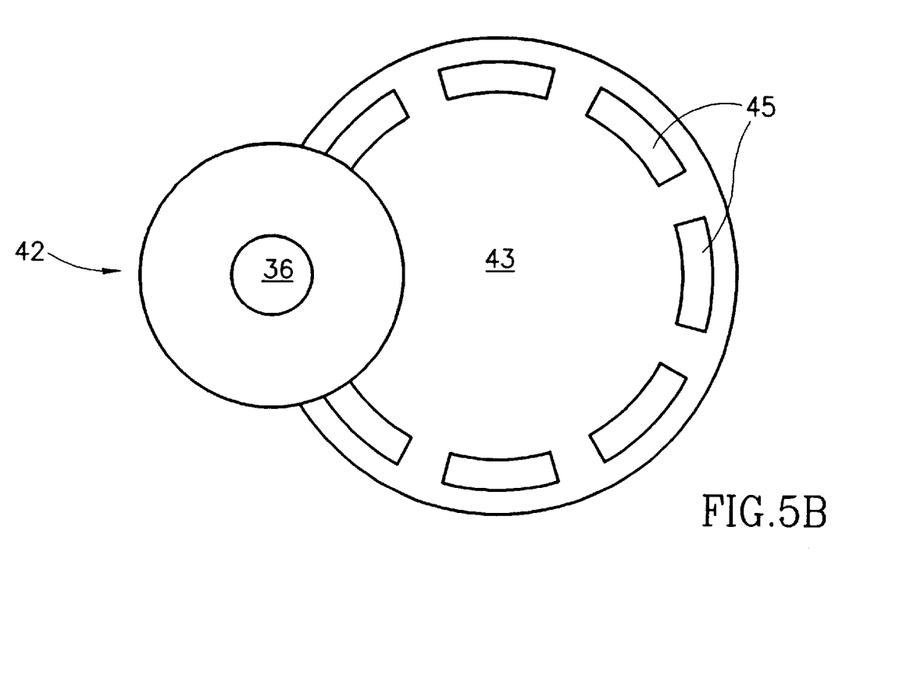

Measurement probe 13, which is located at least partly within processing chambers 12, preferably includes a rod 36, preferably of quartz or sapphire, which couples the radiation from a wafer/rod cavity 38 to the radiation photoconductive or photovoltaic detector 40 via a radiation modulator 42 as shown in FIGS. 5A and 5B. Modulator 42 includes a chopper 43 which is a disk having an annular array of openings 45 which intersect the optical path between rod 36 and photovoltaic detector 40 and which act to modulate the incoming radiation. The chopping of the incoming radiation acts to improve the performance of the detector and electronics system by increasing signal frequency from a dc signal to a signal in which the noise level of the detector and electronics system is considerably reduced, in the process also eliminating dc drift issues.

Figure 6:
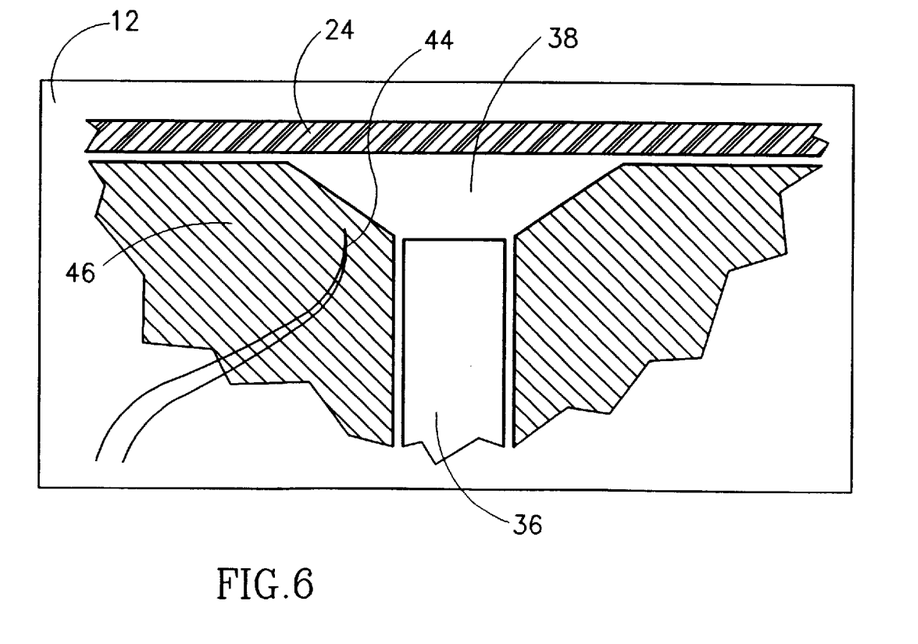
FIG. 6 illustrates a cavity configuration in which the quartz rod couples between semiconductor wafer and heater according one embodiment of the present invention.

One possible configuration of cavity 38 is shown in FIG. 6. Cavity 38 acts to enhance emissivity of wafers of low emissivity. The enhancement is achieved through multiple reflections between wafer 24 and the reflective surfaces of cavity 38. The cavity configuration shown in FIG. 6 is one of many alternatives which can be envisaged for optically coupling rod 36 to wafer 24.

The measurement probe optics are designed to have the same wide acceptance angle from rod 36 as the WECOMP station 10 coupling optics. This is achieved by the unique characteristic of the possible acceptance angle of rod 36 configuration of 90 degrees, which is only limited by the measurement probe coupling optics.

The large acceptance angles makes possible very efficient radiation collection of up to a few steradian compared to relative solid angles of conventional collimated optics of several millisteradian. The large acceptance angles drop the lower limit of the measurable temperature measurement range well below that achievable with conventional collimated beam pyrometer techniques.

In an alternative embodiment, the solid angle of acceptance of the measurement probe optics is chosen to be equal to that of WECOMP station monochromator 11 which farther reduces the error in the emissivity estimation algorithm.

Preferably, a system according to the present invention further includes an embedded thermocouple 44 (FIG. 6) in the heater 46 of each process chamber 12 in which measurement probe 13 is installed. Thermocouple 44 allows for the real time monitoring of heater temperature via a digital thermocouple reading device communicating with personal computer 16. As described in more detail below, the availability of thermocouple 44 facilitates the calibration of, and accounting for, the radiation contributed by heater 46.

In order that the system be capable of simultaneously measuring in more than a single chamber, as would be required in a cluster tool processing environment, a plurality of measurement probes 13 is used, with each measurement probe 13 able to measure simultaneously with, yet independently of, the other probes. FIG. 1 schematically depicts the multiplicity of probes 13, with one probe 13 being provided for each processing chamber 12. Since each probe 13 has its own detector, the various signals can be processed simultaneously or can be handled sequentially by the electronic control unit.

Figure 7A:
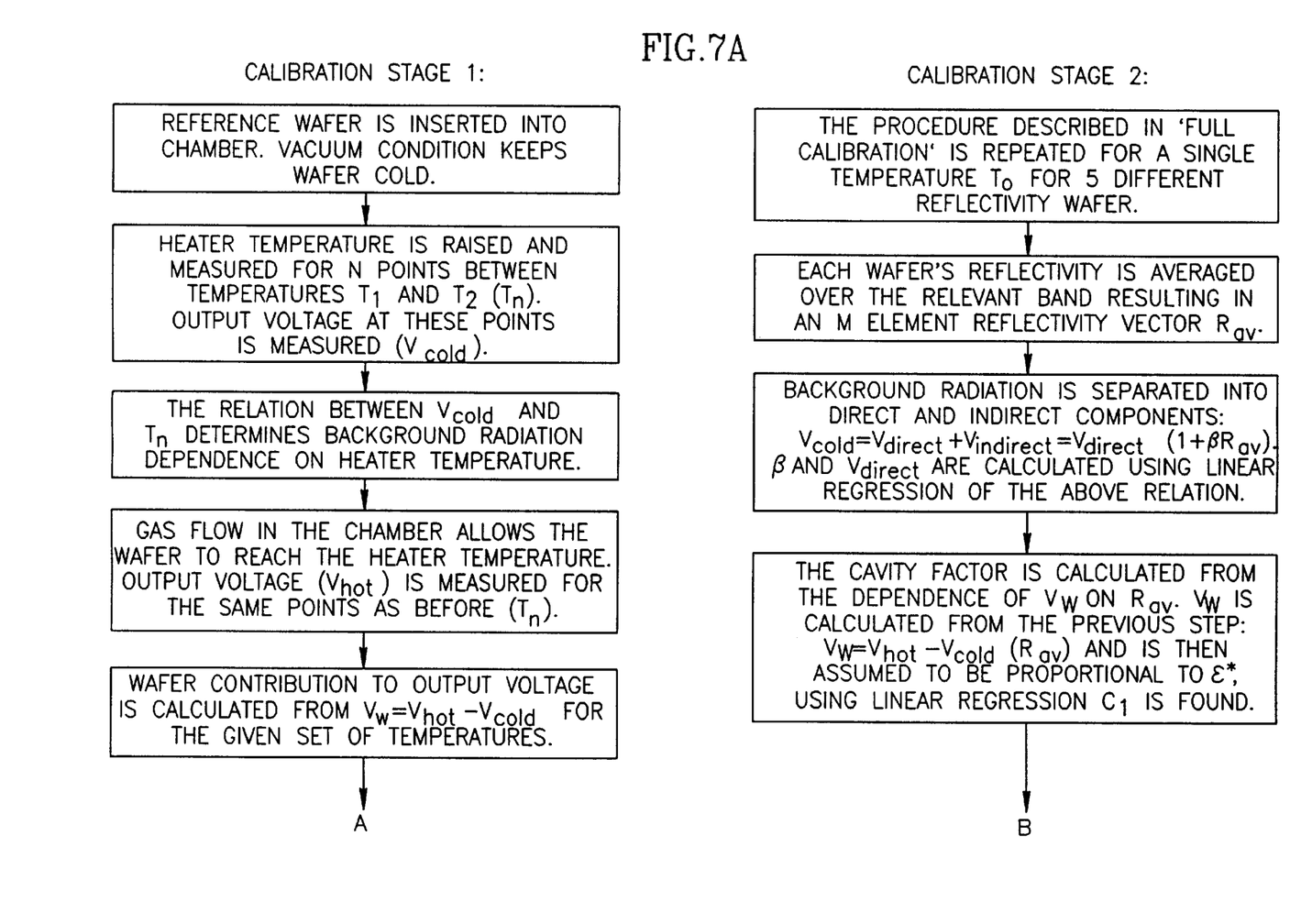
Figure 7B:
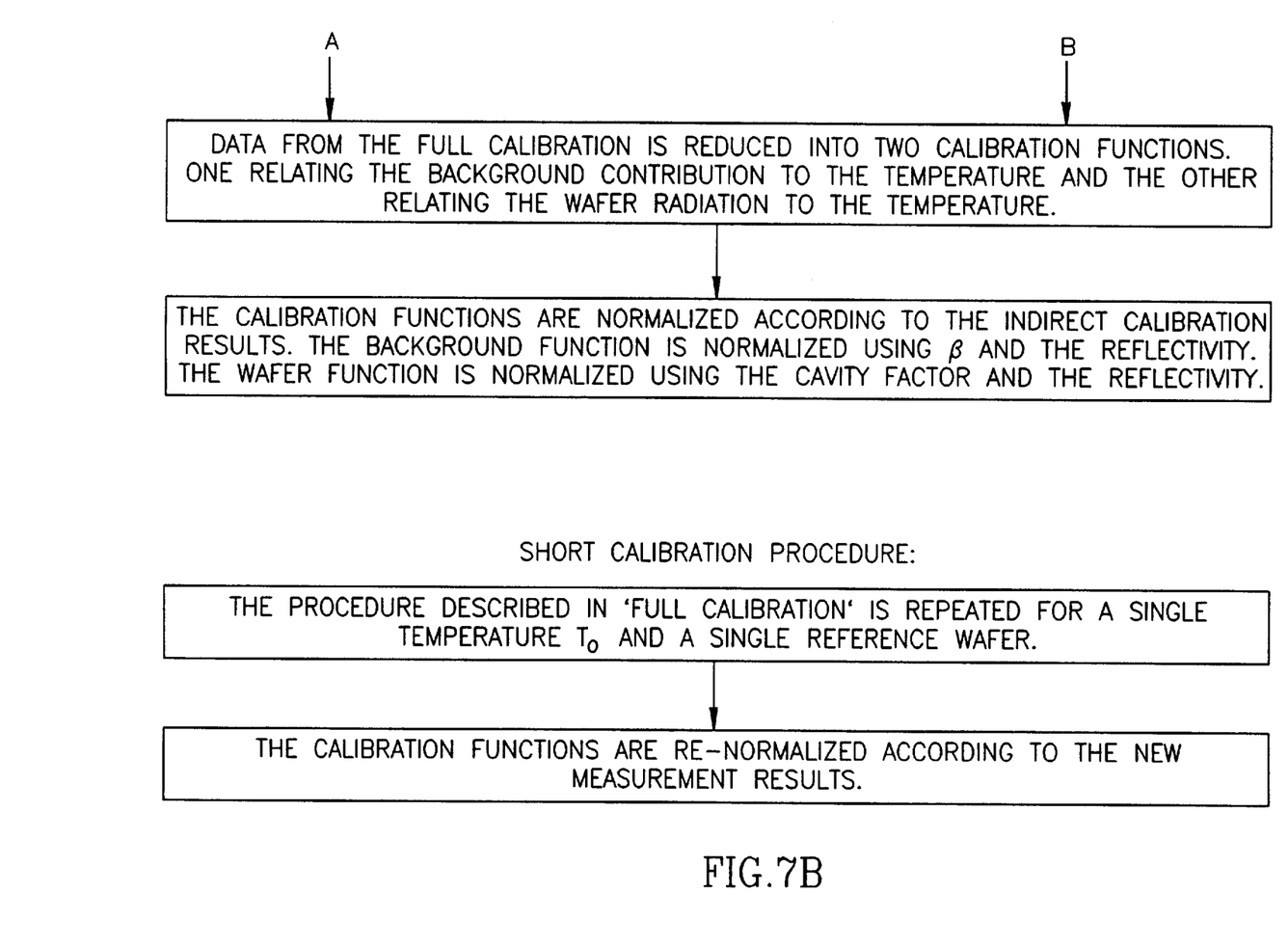

In operation, a system according to the present invention can operate as follows. First, a calibration procedure is carried out, as outlined in FIG. 7. For this purpose, a reference wafer is inserted into processing chamber 12. A vacuum is maintained in processing chamber 12 so as to keep wafer 24 cold. The temperature of heater 46 is then raised and is measured with thermocouple 44 at N points between temperatures of ($T_h$) between $T_1$ and $T_2$, where, $T_h$ is the set of temperatures between temperatures $T_1$ and $T_2$ at which the two steps of the full calibration are performed and is a vector of length N.

The output voltage ($V_{cold}$) at these temperatures is measured, and the relation between $V_{cold}$ and $T_h$ determines background radiation dependence on heater temperature, where, $V_{cold}$ is the output voltage for each temperature of the vector $T_h$ measured when the wafer is cold and therefore not adding to the background radiation and is a vector of length N.

Gas flow in the process chamber 12 is then started which allows wafer 24 to reach the heater temperature. Output voltage ($V_{hot}$) is measured for the same temperatures points as before ($T_h$), where, $V_{hot}$ is the output voltage for each temperature of the vector $T_h$ measured when the wafer is hot and is a vector of length N.

Wafer contribution to output voltage is calculated from:

$$V_w = V_{hot} - V_{cold}$$

for the given set of temperatures, where, $V_w$ is the output voltage related to wafer contribution, after background reduction and is a vector of length N.

In the second stage of the calibration process, the procedure above is repeated, but for a single temperature $T_0$ and M different reflectivity wafers, where, $T_0$ is the temperature at which the indirect calibration is performed.

Each wafer's reflectivity is averaged over the relevant band resulting in an element reflectivity vector $R_{av}$, where, $R_{av}$ is an M-sized vector wherein each element gives the average reflectivity of one of the M wafers used for the indirect calibration. The average is performed over the relevant spectrum window.

The background radiation is then separated into direct and indirect components:

$$V_{cold} = V_{direct} + V_{indirect} = V_{direct} * (1 + \beta R_{av})$$

where, $V_{direct}$ is the part of the background attributed to direct radiation from the heater at temperature $T_0$ and is calculated using a linear regression of the above relation;

$V_{indirect}$ is the part of the background attributed to back-reflections of heater radiation by the wafer and into the system and is a vector of length M; and $\beta$ is the indirect background factor which is calculated using linear regression of the above relation.

The cavity factor is calculated from the dependence of $V_w$ or $R_{av}$, wherein $V_w$ is calculated from the previous step:

$$V_w = V_{hot} - V_{cold}(R_{av})$$

and is then assumed to be proportional to $\epsilon^*$, while $C_f$ is determined using linear regression, where, $C_f$ is the cavity factor; and $\epsilon^*$ is the wafer emissivity for each of the M wafers including the cavity factor and is calculated by the expression:

$$\epsilon^* = (1 - R_{av})/(1 - C_f R_{av}).$$

Data from the full calibration is reduced to two calibration functions, one relating the background contribution to the temperature and the other relating the wafer radiation to the temperature.

The calibration functions are normalized according to the indirect calibration results. The background function is normalized using β and the reflectivity. The wafer function is normalized using the cavity factor and the reflectivity.

In order to periodically fine tune the calibration described above it may be desirable to carry out a short calibration procedure at appropriate times. The short calibration procedure is similar to that described above but for a single temperature $T_0$ and a single reference wafer. The calibration functions determined in the full calibration procedure can then be re-normalized based on the new measurement results.

An alternative calibration can be used which incorporates the spectral measurement of the wafer emissivity. In this technique, instead of using a calibration function for the wafer, a theoretical calibration table can be created, leaving only a geometrical factor to be determined in the calibration process. The background calibration and the indirect calibration remain as previously described.

The theoretical calibration table is created using three known spectral functions: (1) Plank's blackbody radiation equation $W(\lambda)$; (2) the wafer emissivity (including the cavity factor) $\epsilon^*(\lambda)$; and (3) the detector responsivity $R(\lambda)$. For the given set of temperatures T the theoretical voltage can be calculated from:

$$V(T) = A \int_0^\infty W(\lambda, T) \mathfrak{R}(\lambda) \epsilon^*(\lambda) d\lambda$$

The factor A is then found by fitting the measured values of $(V_w, T_h)$ to the table values $(V,T)$.

Figure 8:
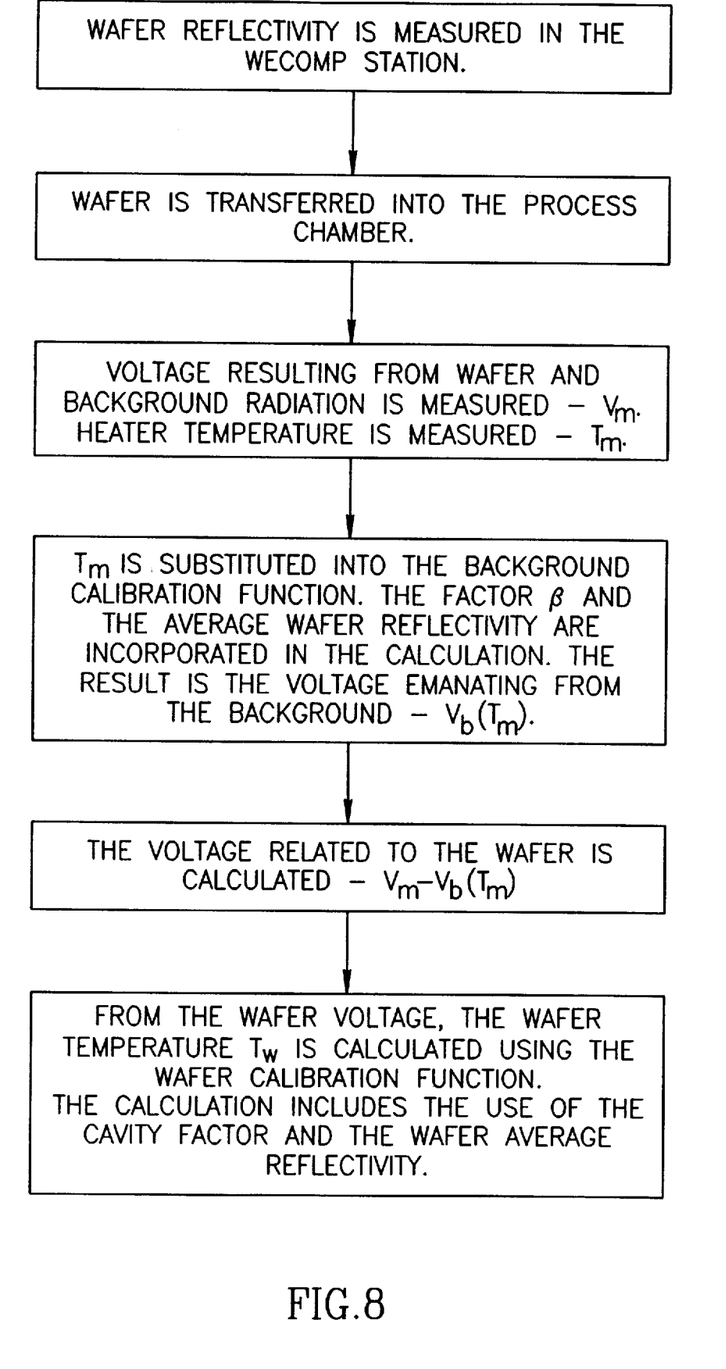
FIG. 8 flow diagram of a measurement procedure.

To measure wafer temperatures the following procedure is followed:

Wafer reflectivity is first measured in WECOMP station 10. Wafer 24 is then transferred into process chamber 12. The voltage resulting from wafer and background radiation $(V_m)$ is measured as is the heater temperature $(T_m)$.

$T_m$ is then substituted into the background calibration function. The factor β and the average wafer reflectivity are incorporated into the calculation. The result is the voltage emanating from the background $(V_b(T_m))$.

The voltage related to the wafer is calculated as $$V_m - V_b(T_m).$$

From the wafer voltage, the wafer temperature $T_w$ is calculated using the wafer calibration function. The calculation includes the use of the cavity factor and the wafer average reflectivity.

While the invention has been described with respect to a limited number of embodiments, it will be appreciated that many variations, modifications and other applications of the invention may be made.

What is claimed is:

1. An emissivity compensating non-contact system for measuring the temperature of a semiconductor wafer, comprising:
    (a) a semiconductor wafer emissivity compensation station for measuring the reflectivity of said wafer at discrete wavelengths, said wafer emissivity compensation station including a spherical mirror positioned behind said wafer at a distance substantially equal to the radius of curvature of said spherical mirror;
    (b) a measurement probe which is optically coupled to a semiconductor process chamber, said probe sensing wafer self emission by means of at least one optical detector and a light modulator;
    (c) background temperature determining means for independently sensing the temperature of a source of background radiation; and
    (d) means for calculating the temperature of said semiconductor wafer based on said reflectivity, self-emission and background temperature.

2. A system as in claim 1, wherein said semiconductor wafer emissivity compensation station includes large angular acceptance optics enabling measurement of both specular and diffuse components of wafer reflectivity.

3. A system as in claim 1, wherein said discrete wavelengths are in the range of from about 0.7 to about 2.2 microns.

4. A system as in claim 1, wherein said water emissivity compensation station includes an optical fiber leading to a monochromator and said wafer emissivity compensation station includes an optical system operative to collimate radiation emanating from said optical fiber and to refocus said radiation on the wafer.

5. A system as in claim 1, wherein said measurement probe operates in a specific optical pass band determined, on the long wavelength side, by the cut-off behavior of said at least one optical detector and, on the short wavelength side, by the spectral drop off of the Planck function.

6. A system as in claim 1, wherein said optical detector includes Si, Ge or InAs.

7. A system as in claim 1, wherein said optical detector is optically coupled to the wafer by means of a transparent rod.

8. A system as in claim 7, wherein said process chamber includes a cavity surface between said transparent rod and the wafer.

9. A system as in claim 7, wherein said rod is made of quartz.

10. A system as in claim 7, wherein said rod is made of sapphire.

11. A system as in claim 1, wherein said process chamber includes a heater and wherein said background temperature determining means includes a thermocouple embedded in said heater and operative to measure a plurality of temperatures of said heater during a calibration procedure in conjunction with the detector signal while a reference wafer is in said process chamber.

12. An emissivity compensating non-contact system for measuring the temperature of a semiconductor wafer, comprising:
    (a) a semiconductor wafer emissivity compensation station for measuring the reflectivity of said wafer at discrete wavelengths;
    (b) a measurement probe which is optically coupled to a semiconductor process chamber, said probe sensing wafer self emission by means of at least one optical detector and a light modulator, each of said at least one optical detector being optically coupled to the wafer by means of a transparent rod, said process chamber including a reflective cavity surface between said transparent rod and the wafer;
    (c) background temperature determining means for independently sensing the temperature of a source of background radiation; and
    (d) means for calculating the temperature of said semiconductor wafer based on said reflectivity, self-emission and background temperature.

13. A system as in claim 12, wherein said semiconductor wafer emissivity compensation station includes large angular acceptance optics enabling measurement of both specular and diffuse components of wafer reflectivity.

14. A system as in claim 12, wherein said discrete wavelengths are in the range of from about 0.7 to about 2.2 microns.

15. A system as in claim 12, wherein said wafer emissivity compensation station includes an optical fiber leading to a monochromator and said wafer emissivity compensation station includes an optical system operative to collimate radiation emanating from said optical fiber and to refocus said radiation on the wafer.

16. A system as in claim 12, wherein said wafer emissivity compensation station includes a spherical mirror positioned behind said wafer at a distance substantially equal to the radius of curvature of said spherical mirror.

17. A system as in claim 12, wherein said measurement probe operates in a specific optical pass band determined, on the long wavelength side, by the cut-off behavior of said at least one optical detector and, on the short wavelength side, by the spectral drop off of the Planck function.

18. A system as in claim 12, wherein said optical detector includes Si, Ge or InAs.

19. A system as in claim 12, wherein said rod is made of quartz.

20. A system as in claim 12, wherein said rod is made of sapphire.

21. A system as in claim 12, wherein said process chamber includes a heater and wherein said background temperature determining means includes a thermocouple embedded in said heater and operative to measure a plurality of temperatures of said heater during a calibration procedure in conjunction with the detector signal while a reference wafer is in said process chamber.

* * * * *